United States Patent
Hutchins (10) Patent No.: US 7,508,466 B2
(45) Date of Patent: Mar. 24, 2009

(54) LASER DIODE BACKLIGHTING OF LC DISPLAY WITH AT LEAST ONE DIODE GENERATING LIGHT BEAM HAVING DIVERGENCE ANGLE AND WITH DISPLAY PANEL HAVING BEAM SPREADER TO INCREASE DIVERGENCE

(75) Inventor: Edward Lloyd Hutchins, Raleigh, NC (US)

(73) Assignee: Cree, Inc., Durham, NC (US)

( * ) Notice: Subject to any disclaimer, the term of this patent is extended or adjusted under 35 U.S.C. 154(b) by 403 days.

(21) Appl. No.: 11/273,431

(22) Filed: Nov. 14, 2005

(65) Prior Publication Data

US 2007/0109463 A1    May 17, 2007

(51) Int. Cl.
    *G02F 1/1335* (2006.01)
(52) U.S. Cl. ......................................................... 349/61
(58) Field of Classification Search ................... 349/61
    See application file for complete search history.

(56) References Cited

U.S. PATENT DOCUMENTS

| | | | |
|---|---|---|---|
| 4,793,691 A | 12/1988 | Enomoto et al. | |
| 5,365,079 A | 11/1994 | Kodaira et al. | 257/59 |
| 5,650,637 A | 7/1997 | Kodaira et al. | 257/72 |
| 5,700,076 A * | 12/1997 | Minich et al. | 353/31 |
| 6,559,827 B1 * | 5/2003 | Mangerson | 345/102 |
| 2003/0117546 A1 | 6/2003 | Conner et al. | |
| 2004/0201879 A1 | 10/2004 | Shih et al. | |
| 2005/0041183 A1 | 2/2005 | Lee | 349/106 |
| 2005/0062903 A1 | 3/2005 | Cok et al. | |
| 2005/0264715 A1 * | 12/2005 | Kahen et al. | 349/61 |
| 2006/0262243 A1 * | 11/2006 | Lester et al. | 349/71 |

FOREIGN PATENT DOCUMENTS

| | | |
|---|---|---|
| EP | 1 292 134 A2 | 3/2003 |
| EP | 1 411 732 | 4/2004 |
| WO | WO 95/34833 | 12/1995 |
| WO | WO 01/53887 A2 | 7/2001 |

OTHER PUBLICATIONS

International Search Report and Written Opinion for International Application No. PCT/US2006/043202, Mailed Mar. 6, 2007.
Laser Diode Application Notes, Optima Glossary, Application Notes, and FAQs, http://optima-prec.com/notes.htm, last modified Apr. 3, 2005.
Newport Corporation Tutorials/Training, Spatial Characteristics of Laser Diodes, https://www.newport.com/servicesupport/Tutorials/default.aspx?id=140, accessed Oct. 20, 2005.
Edmund Optics-Kodak Wratten Color Filters, www.edmundoptics.com, accessed Oct. 26, 2005.
Edmund Optics- Mounted Color Filters, www.edmundoptics.com, accessed Oct. 26, 2005.
Edmund Optics- Optical Cast Plastic Color Filters, www.edmundoptics.com, accessed Oct. 26, 2005.
U.S. Appl. No. 11/022,332 entitled, "Light Emitting Diode Arrays for Direct Backlighting of Liquid Crystal Displays," filed Dec. 23, 2004.
U.S. Appl. No. 10/898,608 entitled "Reflective Optical Elements for Semiconductor Light Emitting Devices," filed Jul. 23, 2004.

* cited by examiner

*Primary Examiner*—David Nelms
*Assistant Examiner*—John S. Heyman
(74) *Attorney, Agent, or Firm*—Myers Bigel Sibley & Sajovec (57) ABSTRACT

An LCD display includes a planar array of transmissive liquid crystal display (LCD) devices, and at least one laser diode device spaced apart from the planar array of LCD devices and configured to illuminate at least a subset of the LCD devices of the planar array of LCD devices such that, in operation, the laser diode device provides backlighting for the subset of LCD devices of the planar array of LCD devices.

17 Claims, 5 Drawing Sheets

LASER DIODE BACKLIGHTING OF LC DISPLAY WITH AT LEAST ONE DIODE GENERATING LIGHT BEAM HAVING DIVERGENCE ANGLE AND WITH DISPLAY PANEL HAVING BEAM SPREADER TO INCREASE DIVERGENCE

FIELD OF THE INVENTION

This invention relates to Liquid Crystal Display (LCD) devices, and more particularly, to backlighting of LCD devices.

BACKGROUND

LCD devices are widely used in flat panel displays for monitors, televisions and/or other displays. As is well known to those having skill in the art, an LCD display generally includes a planar array of LCD devices that act as an array of optical shutters. Transmissive LCD displays may employ fluorescent tubes above, beside and sometimes behind the array of LCD devices to provide backlighting for the display. A diffusion panel behind the LCD devices can be used to redirect and scatter the light evenly to provide uniform brightness and contrast across the display.

For example, it is known to use one or more cold cathode fluorescent tubes adjacent to one or more edges of the planar array of LCD devices, and a light guide or light pipe that directs the light from the cold cathode fluorescent tubes to illuminate the face of the planar array of LCD devices. Unfortunately, such edge lighting may be inefficient, with up to 50% or more of the light being lost.

It is also known to provide an array of cold cathode fluorescent tubes behind and facing the planar array of LCD devices. Unfortunately, an array of cold cathode fluorescent tubes may increase the thickness of the LCD display and/or increase the power consumption thereof. It also may be difficult to uniformly illuminate the planar array of LCD devices with an array of cold cathode fluorescent tubes.

Semiconductor light emitting devices, such as Light Emitting Diode (LED) devices, also may be used for edge illumination of a planar array of LCD devices. For example, U.S. patent application Ser. No. 10/898,608, filed Jul. 23, 2004, entitled Reflective Optical Elements for Semiconductor Light Emitting Devices, assigned to the assignee of the present invention, the disclosure of which is hereby incorporated herein by reference in its entirety as if set forth fully herein, describes side emission LEDs that may be used for large area LCD and/or television backlighting.

LED arrays have also been used as direct backlights for transmissive LCD displays as described in U.S. patent application Ser. No. 11/022,332, filed Dec. 23, 2004, entitled Light Emitting Diode Arrays for Direct Backlighting of Liquid Crystal Displays, assigned to the assignee of the present invention, the disclosure of which is hereby incorporated herein by reference in its entirety as if set forth fully herein.

Figure 1:
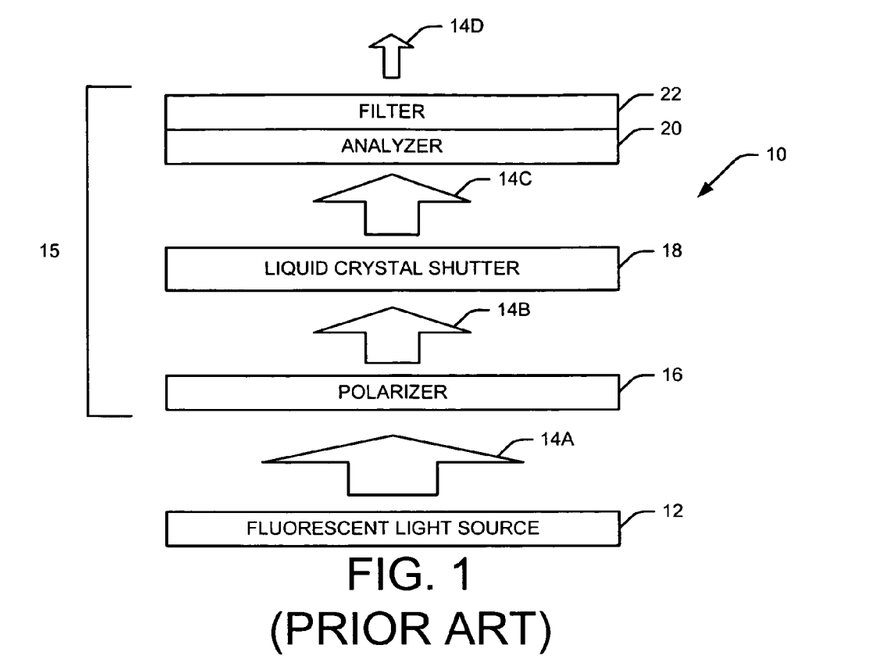
FIG. 1 is a schematic view of a fluorescent-based LCD display.

As is well known in the art, an LCD screen may generate a color image by providing a planar array of red, green and blue (RGB) pixels. By varying the intensity of each of the three colors, a multitude of colors may be generated by a single RGB pixel. A single color (i.e. red, green or blue) pixel 15 of an LCD display illuminated by a fluorescent light source 12 is illustrated in FIG. 1. In a fluorescent-based LCD display system 10, a fluorescent light source 12 generates a high-intensity light 14A, which is directed towards the pixel 15 as illustrated in FIG. 1. As is also well known in the art, a fluorescent light source may generate broad spectrum light that includes wavelength components in the red, green, blue and other portions of the visible spectrum. Light generated by a fluorescent light source 12 may be perceived by an observer as white or near-white light.

Light 14A emitted by the fluorescent light source 12 passes through polarizer 16, which is configured to permit only light 14B that is polarized in a predetermined first direction to pass through it. Thus, a significant amount of light may be absorbed and/or blocked by the polarizer 16. Accordingly, in the illustration of FIG. 1, the arrow that indicates polarized light 14B passing through the polarizer 16 is smaller than the arrow representing light 14A generated by the fluorescent light source 12. A transflective surface (not shown) such as a two-way mirror may be provided between the light source 12 and the polarizer 16. A transflective surface may transmit light from the light source 12 and reflect light coming in from the viewing surface back into the polarizer 16. In this way, the display can be illuminated by a backlight and/or by ambient light.

Next, the polarized light 14B that passes through the polarizer 16 passes through a liquid crystal shutter 18, which is configured to either allow the polarized light 14B to pass through the shutter 18 unchanged or to re-polarize the light 14B to a second polarization direction, based on the charge state of a pair of transparent electrodes (not shown) on either side of the liquid crystal shutter 18. Typically, the second polarization is rotated 90° from the first polarization direction. Thus, for example, the liquid crystal shutter 18 may re-polarize light passing through it when a voltage is applied to the electrodes and may allow light to pass through unchanged when no voltage is applied to the electrodes. In either case, little or no significant absorption of light may occur in the liquid crystal shutter 18. Thus, light 14C exiting the liquid crystal shutter 18 may have substantially the same intensity as light 14B entering the shutter 18. Accordingly, the arrow representing the light 14B is substantially the same size as the arrow representing the light 14C in the illustration of FIG. 1.

The formation of transparent electrodes for LCD displays is well known in the art. For example, the transparent electrodes may be simple electrodes, as in the case of a passive display, or, they may be thin film transistors (TFT) using amorphous silicon, low-temperature poly-Si (LTPS) TFTs, or organic thin film transistors (OTFT) in the case of an active display. Cadmium selenide (CdSe), or similar high mobility amorphous/low temperature deposition process material has been used as the semiconductor material in the thin film transistor as described in U.S. Pat. Nos. 5,650,637 and 5,365,079.

The light 14C exiting the liquid crystal shutter 18 then passes through an analyzer 20, which may simply be a polarizing filter that is configured to pass only light polarized in a second polarization direction and to block, for example, light polarized in the first polarization direction. In this manner, the polarizer 16, the liquid crystal shutter 18 and the analyzer 20 together function as an optical switch that selectively passes/blocks light impinging on the LCD pixel depending on the voltage of the control electrodes. When polarized light 14B from the polarizer 16 (which is polarized in the first polarization direction) is repolarized in the second polarization direction by the liquid crystal shutter 18, it may pass through the analyzer 20. In contrast, when polarized light 14B from the polarizer 16 is not repolarized in the second polarization direction by the liquid crystal shutter 18, it may be blocked/absorbed by the analyzer 20 and not permitted to pass therethrough.

Light that does pass through the analyzer 20 is then filtered by an optical bandpass filter 22, which may remove significant optical energy from the light passing therethrough so that only a narrow band of light 14D in the red, green or blue region of the visible wavelength spectrum passes through the optical filter 22. Thus, in a conventional fluorescent-based LCD system, significant optical energy may be lost in both the polarizer 16 and the filter 22. It will be appreciated that the optical filter 12 could be placed at other locations in the device. For example, the optical filter could be placed between the light source 12 and the polarizer 16.

As will be apparent from the foregoing discussion, a broad spectrum light source such as a fluorescent backlight may generate energy outside the passbands (i.e. the range of frequencies allowed to pass) of the red, green and blue optical bandpass filters 22 of the display that will never be emitted as useful light by the display. Such light essentially represents wasted energy.

Accordingly, in order for the LCD display 10 to provide a given level of light output to the user, the fluorescent backlight 12 must be capable of generating sufficient optical energy to overcome the above-described losses. Loss of optical energy may also increase the amount of heat generated by the display, which may reduce the operating lifetime of the display, in addition to other undesirable effects. For example, for a battery powered electronic device, high backlight brightness and long operating times may require a large and/or expensive battery; correspondingly, designers of portable electronic devices must make a compromise with brightness or operating time to maintain small and/or inexpensive batteries.

Figure 2:
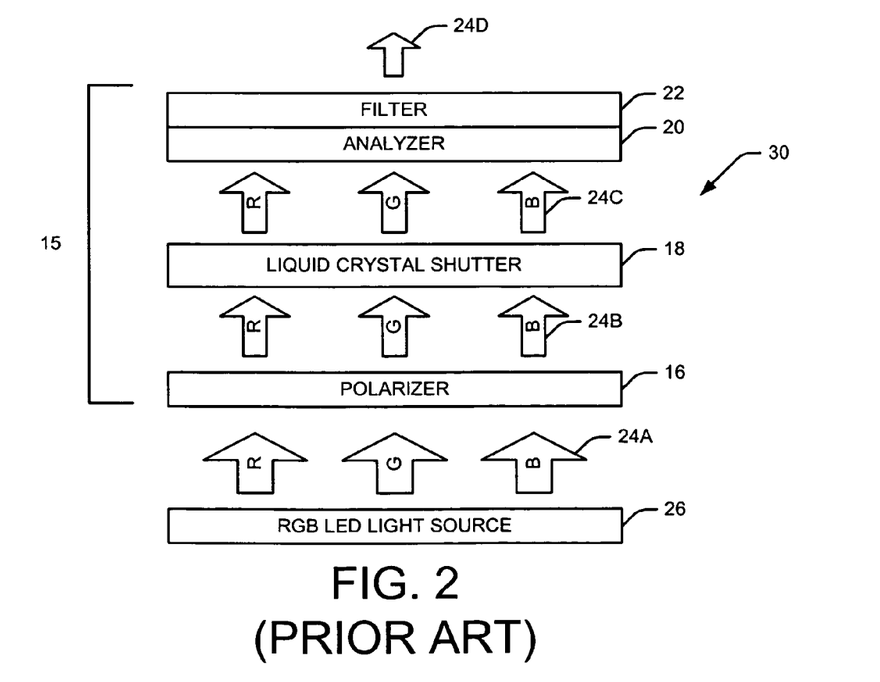
FIG. 2 is a schematic view of an RGB LED-based LCD display.

An LCD display system 30 having an LED-based backlight system is schematically illustrated in FIG. 2. As illustrated therein, an LED light source 26 may generate unpolarized light 24A having energy in the red, green and blue portions of the visible light spectrum using, for example, an array of red, green and blue (RGB) light emitting diodes. The unpolarized light 24A generated by the RGB LED light source 26 is passed through a polarizer 16 which, as described above, only permits light polarized in first polarization direction to pass therethrough. Thus, as with the fluorescent-based LCD display system 10, otherwise useful light may be lost in the polarizer 16 in an RGB LED-based light system 30.

The remainder of the RGB LED-based LCD display system 30 is similar to that of the fluorescent-based LCD display system 10. That is, polarized light 24B exiting the polarizer 16 passes through a liquid crystal shutter 18 which either re-polarizes light passing therethrough or permits light to pass through unchanged depending on the state of a pair of transparent electrodes (not shown) disposed on either side of the liquid crystal shutter 18. Light 24C passing through the liquid crystal shutter 18 is then either blocked or allowed to pass by an analyzer 20 which, as stated above, may be a polarizer having a second polarization direction different from the first polarization direction. An optical bandpass filter 22 then filters out wavelengths other than a desired (R, G or B) wavelength band, resulting in light 24D output by the pixel 15 having a desired wavelength.

While the bandwidths of the light output by the red, green and blue LEDs may be better matched to the passbands of the optical filters 22 of the display system 30, the passbands of the optical filters 22 may still be somewhat narrower than the bandwidths of the LED light sources 26. This is because as the passbands of the filters (i.e. the bandwidth of light passing through the filters) is reduced, the color saturation (i.e. the purity) of the light increases. When the pixels of an LCD display 30 emit more highly saturated red, green and blue light, the pixels may be capable of displaying a wider range of colors. Thus, even though an LED-based backlight 26 may produce light having more selective bandwidths, some optical energy may still be lost in the optical filters 22. However, the majority of optical absorption in an LED-based display system may occur in the polarizer 16.

Accordingly, it will be appreciated, with an RGB light source, less energy may be lost in the filters compared to a white light source. There are two possible benefits to this. The first is that in displays with comparable passbands of the filters, the power consumed by a RGB light source will be less than that of a white light source to obtain comparable display brightness (assuming equal backlight efficiencies). The second is that with an RGB back light source, the passbands of the filters could be made more narrow to improve color resolution and image purity while maintaining the same level of power consumption.

From the foregoing discussion, it is apparent that there is a tradeoff between the bandwidths of the optical filters 22 and the amount of light generated by the backlight. Narrower bandwidths for the optical filters 22 may lead to better color rendering in the LCD display. However, as the passbands of the filters 22 are reduced, less light may be emitted by the display, and more light must be generated by the backlight.

In addition to being able to generate a wide range of colors, it is also desirable for an LCD pixel to be able to generate a dark black color (for example, as opposed to a dark gray color) when the pixel is "off" by blocking substantially all light generated by the backlight. The ability of a conventional LCD display to block a sufficient amount of light to generate a dark black may be limited by the efficacy of the polarizer 16 and/or the analyzer 20. For example, there is a trade-off between the efficacy of the polarizer 20 and the amount of light it blocks. LCD manufacturers may strike a balance between the two. For example, a polarizer 16 that passes only highly polarized light may block too much light, resulting in a dim display. In order to permit more light to pass through the polarizer 16, the strength of the polarizer 16 may be reduced, which may permit some light with "stray" polarization to pass through the polarizer 16. As a result, even when the pixel is "off" and the polarization of light 14B, 24B passing through the polarizer 16 is not rotated by the liquid crystal shutter 18, some of the light 14B, 24B passing through the polarizer 16 may have a polarization that will allow it to pass through the analyzer 20. This may result in some light 14D, 24D being emitted by the pixel 15 even though it is in the "off" state.

In addition, the strength of the analyzer 20 may be balanced against the amount of light 14A, 24A generated by the light source 12, 26. The strength of the analyzer 20 may be related to its thickness. Thus, a thicker analyzer may more effectively reject improperly polarized light. If the analyzer 20 is made thin in order to permit more light to pass through it, it may not reject light that should otherwise be blocked, for example when the pixel 15 is in the "off" state, which may make the display of dark black pixels difficult.

SUMMARY

An LCD display according to some embodiments of the invention includes a planar array of transmissive liquid crystal display (LCD) devices, and at least one laser diode device spaced apart from the planar array of LCD devices and configured to illuminate at least a subset of the LCD devices of the planar array of LCD devices such that, in operation, the laser diode device provides backlighting for the subset of LCD devices of the planar array of LCD devices.

The laser diode device may generate a beam of substantially polarized light, and the display panel may further include a reflector configured to reflect the beam of substantially polarized light onto an illumination area including the subset of LCD devices of the planar array of LCD devices.

The reflector may include a passive reflector such as a convex mirror. In some embodiments, the reflector may include an active reflector such as a micro electro-mechanical system (MEMS) mirror.

The laser diode device may generates a beam of light having a divergence angle, and the display panel may further include a beam spreader and/or a beam scanner configured to increase the divergence angle of the beam of light.

The laser diode device may be configured to generate a beam of substantially polarized light initially directed towards an illumination area including the subset of LCD devices of the planar array of LCD devices.

In some embodiments, the laser diode device is configured to generate a beam of substantially polarized light initially directed away from an illumination area including the subset of LCD devices of the planar array of LCD devices, and the display panel may further include a reflector configured to reflect the beam towards the illumination area.

In some embodiments, the laser diode device may be configured to generate a beam of substantially polarized light initially directed parallel to an illumination area including the subset of LCD devices of the planar array of LCD devices, and the display panel may further include a reflector configured to reflect the beam towards the illumination area.

The LCD display may further include at least a laser diode emitting in the red portion of the visible spectrum, a laser diode emitting in the green portion of the visible spectrum, and a laser diode emitting in the blue portion of the visible spectrum.

A backlight for an LCD display panel includes a laser diode configured to emit polarized light in a visible wavelength, and means for spreading the emitted light across a two-dimensional surface of an LCD display panel, wherein the spread emitted light is polarized.

The means for spreading the emitted light may include a beam scanner, a diverging lens, a beam spreader, an active mirror such as a moving mirror and/or a micro electro-mechanical system (MEMS) mirror.

The backlight may further include at least a laser diode emitting in the red portion of the visible spectrum, a laser diode emitting in the green portion of the visible spectrum, and a laser diode emitting in the blue portion of the visible spectrum.

Methods of providing backlighting for an LCD display according to some embodiments of the invention include generating a beam of polarized laser light and directing the spread beam of polarized laser light towards a pixel of an LCD screen.

The methods may further include scanning the spread beam of polarized light across the LCD screen, spreading the beam of polarized laser light, and/or reflecting the beam of polarized laser light off of a reflector toward the pixel of the LCD screen.

In some embodiments, reflecting the beam of polarized laser light may include reflecting the beam of polarized laser light using a passive reflector and/or reflecting the beam of polarized laser light may include reflecting the beam of polarized laser light using an active reflector, such as a micro electro-mechanical system (MEMS) mirror.

A method of providing backlighting for an LCD display according to some embodiments of the invention includes generating a first beam of polarized laser light of a first color, directing the first beam of polarized laser light towards an LCD screen including an array of pixels, selectively activating a first plurality of pixels of the array of pixels to generate a color separated image of the first color, generating a second beam of polarized laser light of a second color, directing the second beam of polarized laser light towards the LCD screen, and selectively activating a second plurality of pixels of the array of pixels to generate a color separated image of the second color. Some methods may further include generating a third beam of polarized laser light of a third color, directing the third beam of polarized laser light towards the LCD screen, and selectively activating a third plurality of pixels of the array of pixels to generate a color separated image of the third color.

A display according to some embodiments of the invention includes a planar array of transmissive liquid crystal display devices, and at least one laser diode device spaced apart from the planar array of LCD devices and configured to illuminate at least a subset of the LCD devices of the planar array of LCD devices such that, in operation, the laser diode device provides backlighting for the subset of LCD devices of the planar array of LCD devices. At least one of the transmissive liquid crystal display devices of the planar array of transmissive liquid crystal display devices may include a liquid crystal shutter, and an analyzer positioned to receive light passing through the liquid crystal shutter.

The display may further include an optical filter positioned to filter light passing through the liquid crystal shutter. The optical filter may have a passband of about 50 nm or less in the green or blue portions of the visible spectrum.

The display may further include a polarizer configured to polarize light generated by an LCD backlight and impinging on the liquid crystal shutter.

The optical filter may be positioned between the laser diode and the polarizer, between the laser diode and the liquid crystal shutter, and/or between the liquid crystal shutter and the analyzer. The analyzer may also be positioned between the optical filter and the liquid crystal shutter.

A display according to some embodiments of the invention includes a planar array of transmissive liquid crystal display devices, at least one of the transmissive liquid crystal display devices of the planar array of transmissive liquid crystal display devices including an optical switch, the optical switch consisting of a liquid crystal shutter positioned to receive incident light generated by a backlight, and an analyzer positioned to receive light passing through the liquid crystal shutter. The transmissive liquid crystal display device may further include an optical filter positioned to filter light passing through the liquid crystal shutter.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower", "base", or "horizontal", and "upper", "top", or "vertical" may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Moreover, the terms "front" and "back" are used herein to describe opposing outward faces of a flat panel display. Conventionally, the viewing face is deemed the front, but the viewing face may also be deemed the back, depending on orientation.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

Figure 3A:
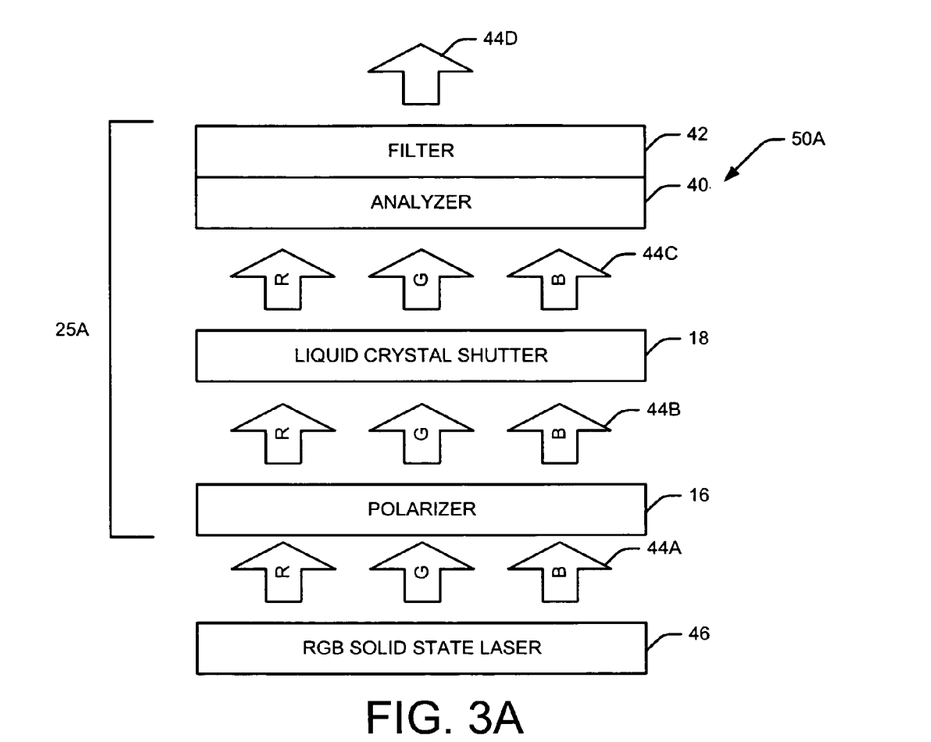
FIGS. 3A-3B are schematic views of LCD displays according to embodiments of the invention.

FIG. 3A is a schematic view of backlighting systems for LCD displays according to various embodiments of the present invention. As shown in FIG. 3A, an LCD display system 50A includes an RGB solid state laser light source 46 which generates narrow bandwidth light 44A in the red, blue and green regions of the visible spectrum. The light 44A is passed through a pixel 25A, which either blocks all light or passes light having a particular wavelength depending on whether the pixel 25A is in an "off" state or an "on" state, respectively.

The RGB solid state laser light source 46 may include, for example, a red laser diode, a green laser diode and a blue laser diode. Red laser diodes are commercially available products that are used in a wide range of products, including DVD players, CD players and barcode scanners. Gallium nitride-based blue and green laser diodes have been demonstrated by various organizations. In addition, blue and/or green laser diodes may be formed, for example, using a frequency doubled infrared solid state laser source. Such frequency-double solid state lasers are commercially available.

Light 44A generated by the RGB laser light source 46 may be highly polarized at the source in a first polarization direction. In general, stimulated emission from a single cavity laser diode is linearly polarized in a direction parallel to the laser junction. However, spontaneous emission with a random polarization and/or with a polarization perpendicular to the laser junction may also be present. For a laser diode operating near its maximum power, the ratio of parallel components divided by the perpendicular components (i.e. the polarization ratio) is typically greater than 100:1. Thus, when the light 44A generated by the RGB laser light source passes through the polarizer 16, very little optical energy may be lost due to absorption in the polarizer 16 provided the polarization direction of the polarizer 16 is aligned to the first polarization direction of the RGB laser light source 46. Moreover, since there may be very little stray polarization in the light 44A generated by the RGB laser light source 46, the strength of the polarizer 16 may be reduced, which may reduce the thickness and/or cost of the overall display 50A Light 44B passing through the polarizer 16 then passes through a liquid crystal shutter 18 as in conventional LCD display systems. As described above, light 44B entering the liquid crystal shutter 18 is either allowed to pass unchanged in polarization or re-polarized to a second polarization direction (which is usually rotated 90° from the first polarization direction). Light 44C exiting the liquid crystal shutter 18 then passes through an analyzer 40 and an optical filter 42. As discussed above, the analyzer 40 may be simply a polarizing filter configured to permit light polarized in the second polarization direction to pass therethrough. Thus, when the pixel 25A is "on," light 44C that has been re-polarized to the second polarization direction may pass through the analyzer 40.

As in conventional LCD displays, an optical filter 42 filters out unwanted wavelengths to permit the pixel 25A to produce a red, green or blue light having a narrow spectral bandwidth. As discussed above, the narrower the passband of the optical filter 42, the more pure the light that will be emitted by the pixel 42. Thus, in some embodiments, it is desirable for the passband of the optical filter to be as narrow as possible. In an LCD display 50A having an RGB laser backlight 46, the passband of the filter 22 may be made arbitrarily small, since the RGB laser backlight 46 may generate light at red, green and blue frequencies having extremely narrow bandwidths, for example with a FWHM of less than 10 nm. Thus, in some embodiments, the passband of one or more of the filters 42 maybe selected to be as small as about 50 nm or less in the green or blue portions of the visible spectrum. It will be appreciated that a red filter may be a longpass filter rather than a bandpass filter, given the location of the red spectrum at the edge of the visible spectrum. Thus, in an LCD display 50A having an RGB laser backlight 46, very little light may be lost due to the filter 42. Moreover, in an LCD display 50A having an RGB laser light source 46, very little light is generated that will not pass through at least one of the red, green or blue filters 42.

Alternatively, since there is very little optical energy in the light 44A generated by the RGB laser light source 46 in wavelengths other than the particular red, green and blue wavelengths emitted by the RGB laser light source 46, the passbands of the filters 42 of an RGB laser-based system 50A may be substantially increased over the passbands of the filters 22 of conventional fluorescent-based LCD displays while still maintaining high color purity. That is, because of the high color purity of the RGB laser source 46, the system 50A may not be as dependent on the filters 42 to provide a light emission with high color purity.

In some embodiments, it may be possible to omit the filter 42 altogether, due to the spectral purity of the light emitted by the laser diode backlight 46. Thus, in some embodiments, the pixel may include an optical filter consisting only of an LCD shutter and an analyzer. For example, light from the laser diode backlight 46 may be scanned across pixels and selectively switched on and off to illuminate selected pixels in the display screen. Alternatively, light from the laser diode backlight 46 may be scanned across the entire screen one color at a time, and the pixels may be selectively opened and closed via LCD shutters to generate sequential color-separated images that may be perceived by a viewer as a single, full-color image. Light from the three laser diodes may be scanned sequentially or simultaneously across the pixels, for example, using a scanning system as described below.

As the polarity of the light 44B passing through the polarizer 16 may be more highly polarized than light in a conventional LCD display system that does not include a polarized light source such as the RGB laser source 46, there may be less stray polarization in the light 44B that may undesirably pass through the analyzer 40 when the pixel is "off." Accordingly, in some embodiments of the invention, the analyzer 40 may not need to be as strong as an analyzer of a conventional LCD display. Thus, the analyzer 40 may be made thinner, thus reducing the cost and/or thickness of the LCD display 50A, while the pixel 25A may be capable of displaying a darker black color when the pixel is in the "off" state.

Figure 3B:
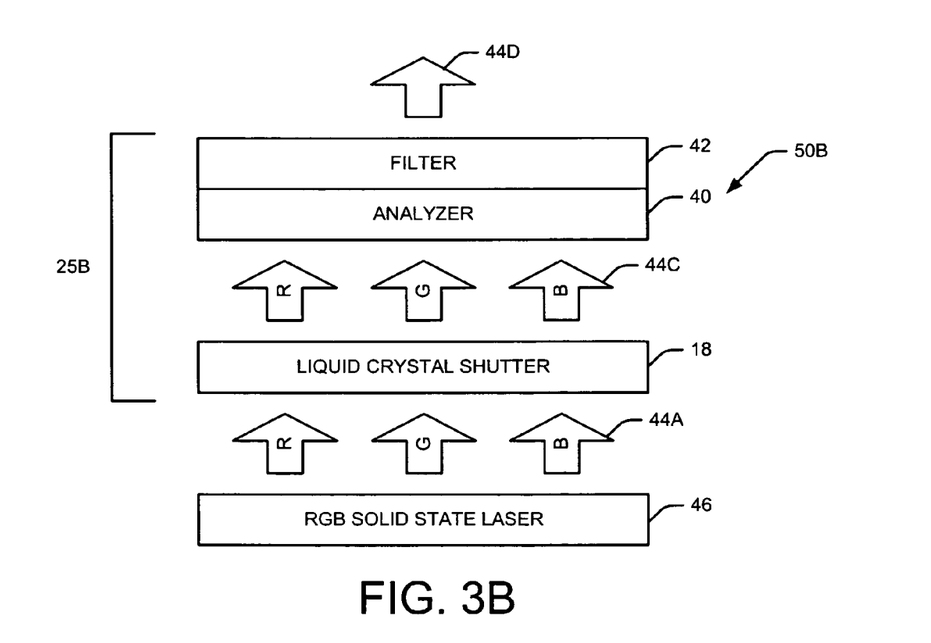

An RGB laser-based LCD display 50B according to further embodiments of the invention is illustrated in FIG. 3B. As illustrated therein, an LCD display 50B may include an RGB solid state laser light source 46 which illuminates a pixel 25B including a liquid crystal shutter 18, an analyzer 40 and an optional optical filter 42. In the embodiments illustrated in FIG. 3B, the LCD display may not include a polarizer between the RGB laser light source 46 and the liquid crystal shutter 18, as the polarization of the RGB laser light source may be sufficiently strong that an additional polarizer may not be needed. Accordingly, in systems according to the embodiments of FIG. 3B, there may be no optical losses associated with a polarizer. In that case, an optical switch portion of the pixel 25B may by realized using only the liquid crystal shutter 18 and the analyzer 40. Alternatively, the RGB laser light source 46 may include a polarizer (not shown) as part of the assembly of the laser source 46.

It will be understood that an LCD display according to embodiments of the invention may include other features not illustrated in FIGS. 3A and 3B including, for example, protective coverings, reflective coatings, anti-reflection coatings, and/or other items.

FIGS. 4-11 illustrate various arrangements of RGB laser backlight sources and LCD display screens in accordance with embodiments of the invention. It will be understood that the various arrangements shown in FIGS. 4-11 are presented for illustrative purposes only, and that the invention may be embodied in many other configurations without departing from the scope of the invention.

Figure 4:
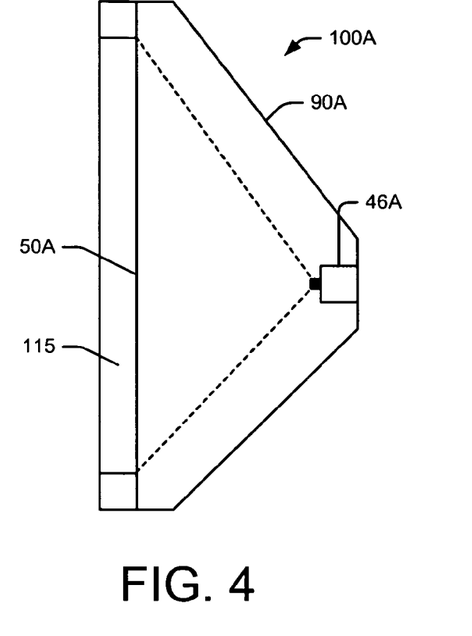
FIGS. 4-5 are cross-sectional schematic views of display panels according to embodiments of the invention.

Turning to FIG. 4, an LCD display 100A is schematically depicted in side view. As illustrated in FIG. 4, an LCD display 100A includes a housing 90A having an LCD display screen 115 at one side thereof. As discussed above, an LCD display screen 115 includes a two dimensional array of LCD devices, each of which may include a red, green and blue pixel as described above in connection with the embodiments of FIGS. 3A and 3B. LCD display screen 115 includes an illumination area 50A which is illuminated by an RGB laser light source 46A, which may be mounted behind the LCD display screen 115 as illustrated such that the laser light emitted by the RGB laser light source 46A is projected directly to the illumination area 50A.

Figure 12:
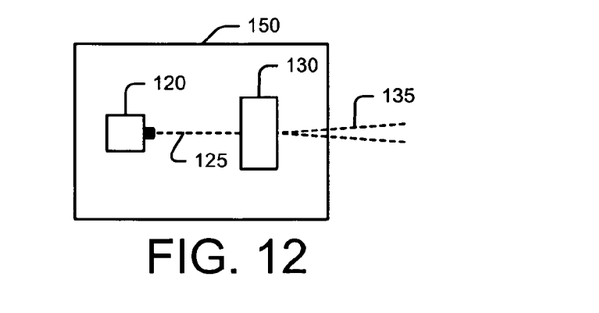
FIGS. 12-13 are schematic views of laser sources for use with various embodiments of the invention.

As is well known, a laser light source may produce a beam having a low angle of divergence. Thus, in order to project a laser beam uniformly onto a two-dimensional area, such as illumination area 50A, it may be desirable to spread and/or scan the beam. For example, as illustrated in FIG. 12, a laser light source 150 may include a laser 120 which generates a beam 125 having a low angle of divergence. The beam 125 may be passed through a scanner 130 which scans the beam along horizontal and vertical axes to produce a scanned beam 135. It will be understood that the laser 120 may include a red, green and/or blue solid state laser diode, and/or laser diodes emitting in other spectral regions depending on the color gamut desired. In addition, the laser 120 may include more than three laser diodes for an enlarged color gamut.

Figure 13:
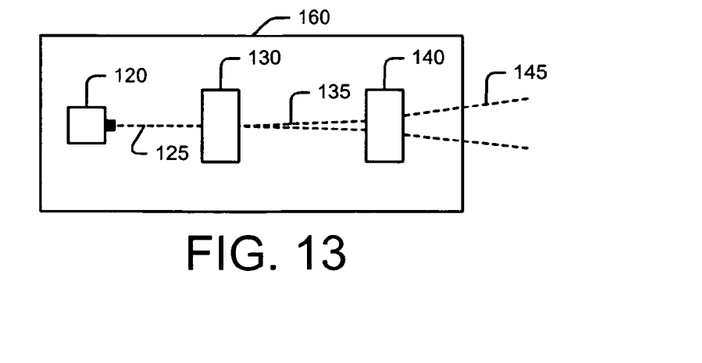

A laser light source 160 is illustrated in FIG. 13. Laser light source 160 includes a laser 120 which emits a beam 125 having a low angle of divergence. The beam 125 is passed through a beam scanner 130 which scans the beam along horizontal and vertical axes to produce a scanned beam 135 having a larger angle of divergence. The scanned beam 125 is then passed through a beam spreader 140 which is configured to increase the angle of divergence of the beam 135 to produce an output beam 145 having an even larger angle of divergence. It will be understood that multiple scanners and/or spreaders may be used to increase the angle of divergence of the beam output by a laser light source 160. It will be further understood that the order of beam scanning and beam spreading may be reversed or otherwise altered from that shown in the embodiments of FIG. 13. Moreover, a beam scanner 130 may include sequential horizontal and/or vertical beam scanners.

Returning to FIG. 4, the spread and/or scanned beam output by the RGB laser light source 46A is projected onto a two-dimensional illumination area 50A of the LCD display screen 115. In some embodiments, the LCD display screen 115 may be configured in accordance with the embodiments of FIG. 3A. That is, each pixel in the display screen may include a polarizer 16, a liquid crystal shutter 18, an analyzer 40 and a filter 42. Thus, in some embodiments, the beam output by the RGB laser light source 46A may first pass through a polarizer 16 before passing through the shutter 18, the analyzer 40 and the filter 42.

In other embodiments, the LCD display screen 115 may be configured in accordance with the embodiments of FIG. 3B. That is, each pixel in the display screen may include a liquid crystal shutter 18, an analyzer 40 and a filter 42. Thus, in some embodiments, the beam output by the RGB laser light source 46A may pass through a liquid crystal shutter 18 without first passing through a polarizer 16.

It will be understood that while a single RGB laser light source 46A is shown in FIG. 4, three separate laser light sources (i.e. red, green and blue) may be provided.

Figure 5:
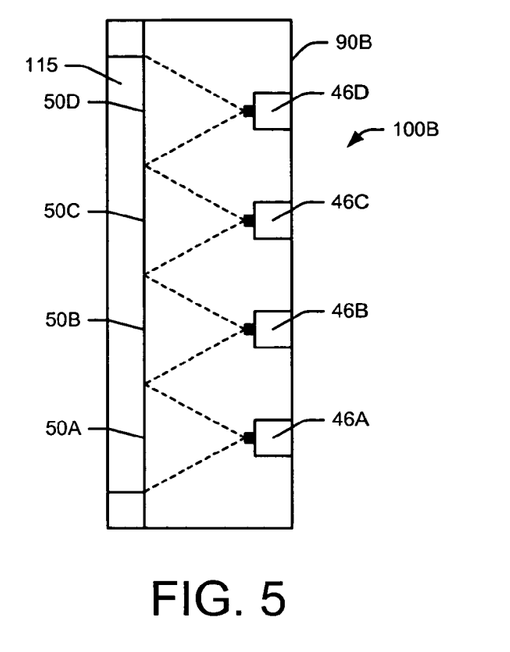
Figure 6:
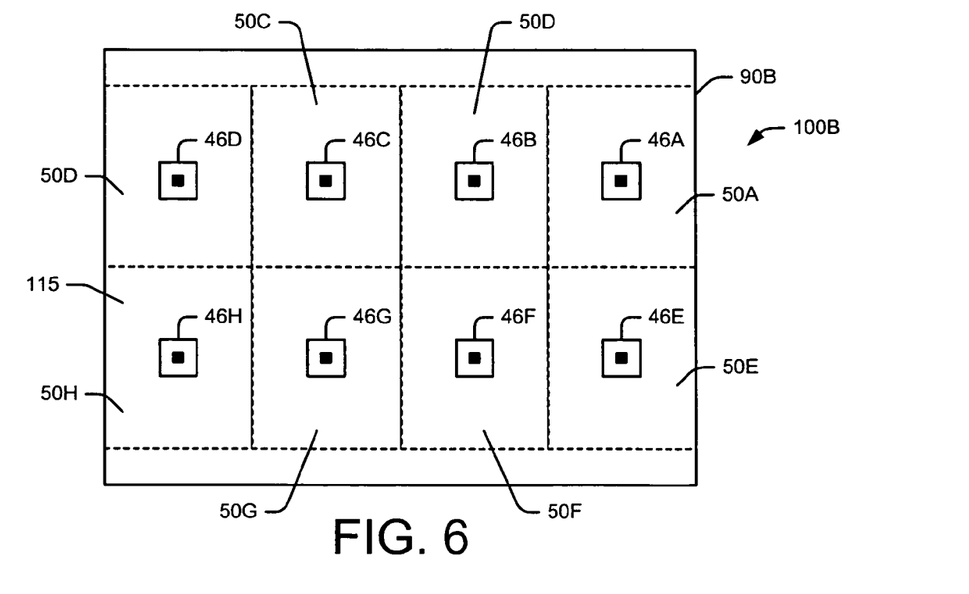
FIG. 6 is a schematic view of a display panel according to embodiments of the invention.

Further embodiments according to the invention are illustrated in FIGS. 5 and 6, which are schematic top and front views, respectively, of an LCD display system 100B which includes a housing 90B having an LCD display screen 115 positioned at one side thereof. The display screen 115 is divided up into a number of illumination areas 50A-50H, each of which is illuminated by a corresponding RGB laser light source 46A-46H. The illumination areas 50A-50H may or may not overlap adjacent illumination areas. In the embodiments illustrated in FIGS. 5-6, the illumination areas 50A-50H do not overlap. However, in some cases it may be desirable for the illumination areas to overlap, for example to provide more even light distribution over the LCD display screen 115.

Figure 7:
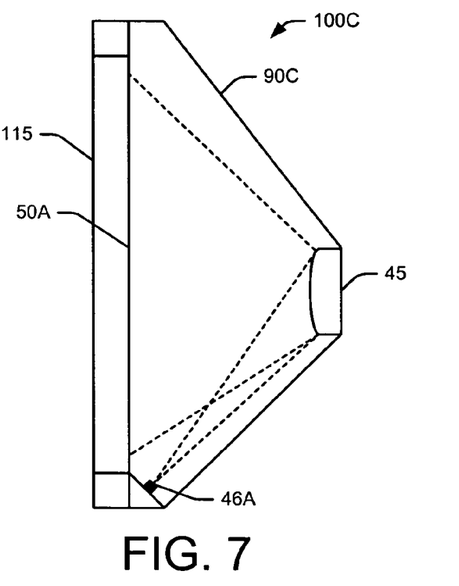
FIGS. 7-8 are cross-sectional schematic views of display panels according to embodiments of the invention.

Further embodiments of the invention are illustrated in FIG. 7. As shown therein, an LCD display 100C includes a housing 90C having an LCD display screen 115 on one side thereof. An RGB laser light source 46A is mounted within the housing and projects light onto an illumination area 50A of the LCD display screen 115. As discussed above, the RGB laser light source 46A may include one or more beam spreaders and/or beam scanners to increase the angle of divergence of the beam emitted by the light source 46A to thereby increase the area illuminated by the beam. In addition, the LCD display system 100C may include a mirror 45 which reflects the beam from the light source 46A onto the illumination area 50A. The mirror 45 may further spread the beam from the light source 46A to increase the size of the illumination area 50A.

In some embodiments, the mirror 45 may include a passive mirror. Furthermore, the mirror 45 may have a convex surface that may further spread the beam emitted by the light source 46A.

In other embodiments, the mirror 45 may include an active mirror such as, for example, a micro electro-mechanical system (MEMS) mirror that is capable of controllably reflecting a beam of light in a desired direction. MEMS mirrors are well known in the art, and have been used, for example, as optical switches and as reflectors in digital light projection (DLP) televisions.

Figure 8:
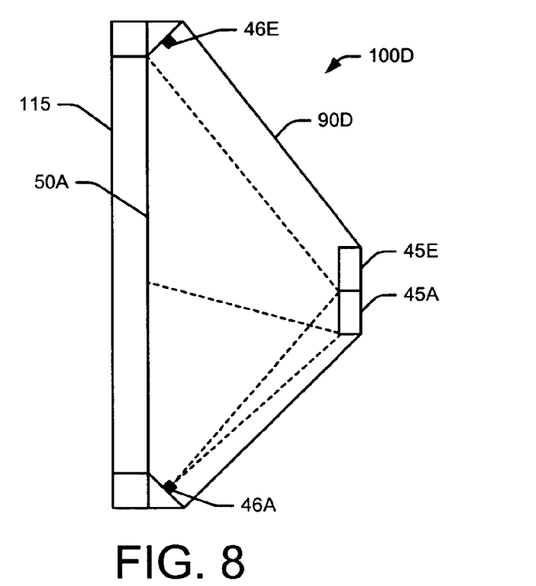
Figure 9:
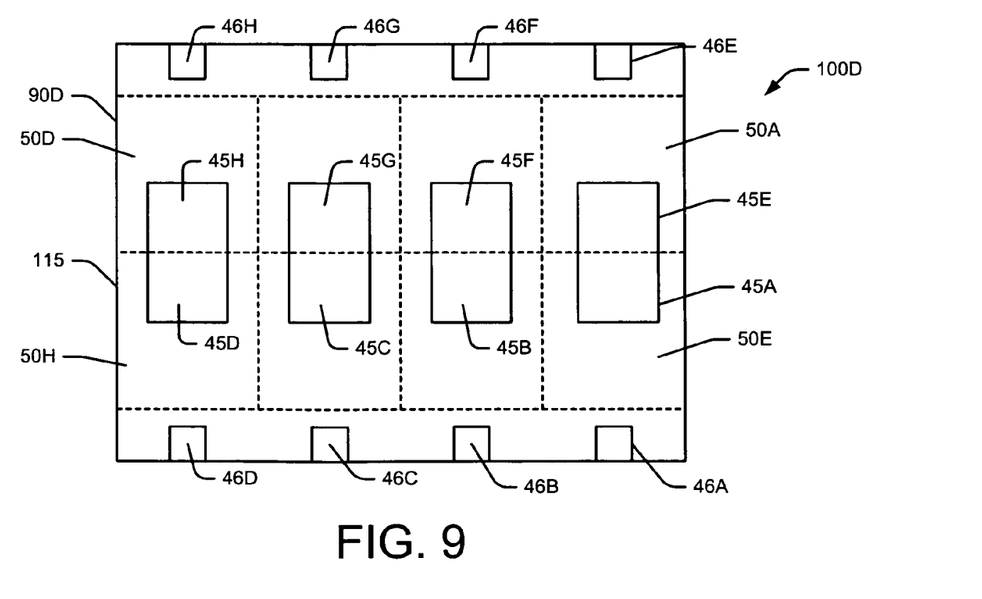
FIG. 9 is a schematic view of a display panel according to embodiments of the invention.

Further embodiments of the invention are illustrated in FIGS. 8 and 9, which are side and front views, respectively, of an LCD display system 100D including a housing 90D having an LCD display screen 115 mounted on one side thereof. The system 100D illustrated in FIGS. 8 and 9 includes multiple RGB laser lights sources 46A-46H, each of which projects a beam onto a corresponding illumination area 50A-50H on the LCD display screen 115. The beams from the RGB laser light sources 46A-46H are reflected off of corresponding mirrors 45A-45H, which as discussed above may include active and/or passive reflecting elements. Moreover, as discussed above, the RGB laser light sources 46A-46H may include features to provide beam spreading and/or beam scanning in order to cause the emitted laser beams to illuminate the illumination areas 50A-50H.

While the embodiments illustrated in FIGS. 8-9 include eight RGB laser sources 46A-46H and eight corresponding illumination areas 50A-50H, it will be understood that more or less RGB laser sources and corresponding illumination areas may be provided. In addition, while the illumination areas 50A-50H illustrated in FIG. 9 are non-overlapping, it will be understood that the illumination areas may overlap in some embodiments of the invention. It will be further understood that while the light sources 46A-46H illustrated in FIGS. 8-9 are described as including red, green and blue lasers, the red, green and blue lasers may be provided in separate housings and/or as separate units. Moreover, because of differences in beam characteristics, brightness and/or other characteristics, it may be desirable for an LCD system 100D to include a different number of lasers of one wavelength than of other wavelengths. For example, it may be desirable for the LCD system 100D to include more blue and/or green lasers than red lasers.

Figure 10:
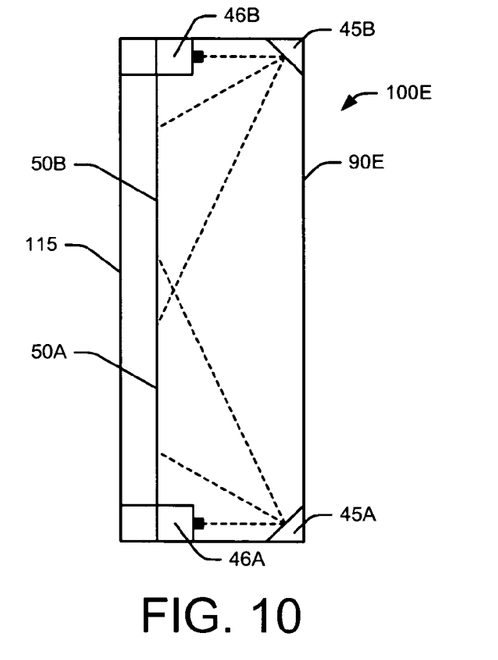
FIGS. 10-11 are cross-sectional schematic views of display panels according to embodiments of the invention.

Further embodiments of the invention are illustrated in FIG. 10, which shows an LCD display 100E including a housing 90E having an LCD display screen 115 on one side thereof. As illustrated in FIG. 9, at least some of the RGB laser light sources 46A, 46B may be oriented such that the initial direction of the emitted beam is in a substantially perpendicular direction away from the LCD screen 115. The emitted beam is reflected by reflectors 45A, 45B toward corresponding illumination areas 50A, 50B of the LCD display screen 115. As discussed above, reflectors 45A, 45B may include active and/or passive elements.

Figure 11:
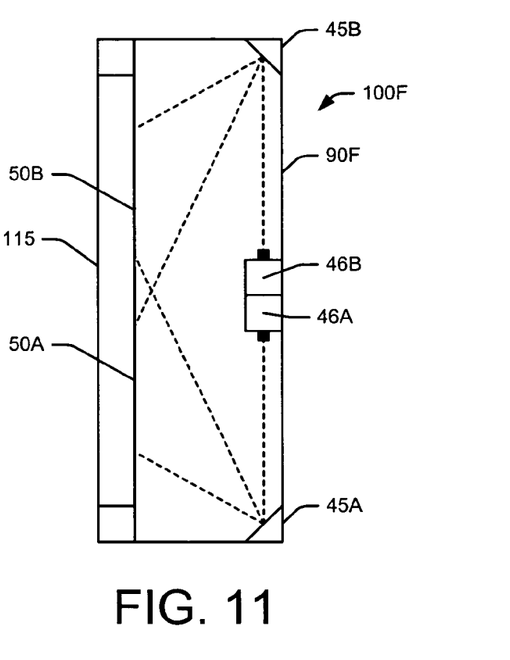

Similarly, in the embodiments illustrated in FIG. 11, the RGB laser light sources 46A, 46B in the LCD display system 100F may be oriented such that the initial direction of the emitted beam is parallel to the surface of the LCD display screen 115. The emitted beam is reflected by reflectors 45A, 45B toward corresponding illumination areas 50A, 50B on the LCD display screen 115.

It also will be understood by those having skill in the art that various combinations and subcombinations of embodiments of FIGS. 4-11 may be provided according to other embodiments of the present invention. Thus, for example, embodiments of FIGS. 7-11 may be combined in various combinations to provide a variety of illumination patterns. In addition, a combination of direct and reflected illumination may be used in some embodiments of the invention, and a combination of active and passive reflection may be employed.

While embodiments of the invention have been described with respect to solid state light source including red, green and blue laser diodes, it will be appreciated that other colors could be selected for the light source to provide an appropriate/different color gamut. Moreover, more than three sources could be used in some embodiments according to the present invention to provide an enlarged color gamut. Thus, a laser light source referred to herein as an "RGB" laser light source may include laser emitting light other than in the red, blue and/or green spectra, and need not emit light in the red, blue and/or green spectra.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A display comprising:
    a planar array of transmissive liquid crystal display (LCD) devices; and
    a plurality of laser diode devices including at least a laser diode emitting in the red portion of the visible spectrum, a laser diode emitting in the green portion of the visible spectrum, and a laser diode emitting in the blue portion of the visible spectrum spaced apart from the planar array of LCD devices and configured to sequentially illuminate at least a subset of the LCD devices of the planar array of LCD devices such that, in operation, the plurality of laser diode devices provides backlighting for the subset of LCD devices of the planar array of LCD devices while the subset of LCD devices sequentially generates color-separated images corresponding to the respective colors of the laser diode devices;
    wherein at least one of the plurality of laser diode devices generates a beam of light having a divergence angle, and wherein the display panel further comprises a beam spreader configured to increase the divergence angle of the beam of light.

2. The display of claim 1, wherein the plurality of laser diode devices generate respective beams of substantially polarized light, and wherein the display panel further comprises a reflector configured to reflect the beams of substantially polarized light onto an illumination area including the subset of LCD devices of the planar array of LCD devices.

3. The display of claim 2, wherein the reflector comprises a passive reflector.

4. The display of claim 3, wherein the reflector comprises a convex mirror.

5. The display of claim 2, wherein the reflector comprises an active reflector.

6. The display of claim 5, wherein the reflector comprises a micro electro-mechanical system (MEMS) mirror.

7. The display of claim 1, wherein the display panel further comprises a beam scanner configured to increase the divergence angle of the beam of light.

8. The display of claim 1, wherein the plurality of laser diode devices are configured to generate respective beams of substantially polarized light initially directed towards an illumination area including the subset of LCD devices of the planar array of LCD devices.

9. The display of claim 2, wherein the plurality of laser diode devices are configured to generate respective beams of substantially polarized light initially directed away from an illumination area including the subset of LCD devices of the planar array of LCD devices, and wherein the display panel further includes a reflector configured to reflect the beams towards the illumination area.

10. The display of claim 2, wherein plurality of one laser diode devices are configured to generate respective beams of substantially polarized light initially directed parallel to an illumination area including the subset of LCD devices of the planar array of LCD devices, and wherein the display panel further includes a reflector configured to reflect the beams towards the illumination area.

11. A display comprising:
    a planar array of transmissive liquid crystal display (LCD) devices; and
    a plurality of laser diode devices including at least a laser diode emitting in the red portion of the visible spectrum, a laser diode emitting in the green portion of the visible spectrum, and a laser diode emitting in the blue portion of the visible spectrum spaced apart from the planar array of LCD devices and configured to sequentially illuminate at least a subset of the LCD devices of the planar array of LCD devices such that, in operation, the plurality of laser diode devices provides backlighting for the subset of LCD devices of the planar array of LCD devices while the subset of LCD devices sequentially generates color-separated images corresponding to the respective colors of the laser diode devices;
    wherein at least one of the laser diode devices generates a beam of substantially polarized light having a divergence angle, and wherein the display panel further comprises a beam scanner configured to increase the divergence angle of the beam of substantially polarized light.

12. A display comprising:
    a planar array of transmissive liquid crystal display devices; and
    at least one laser diode device spaced apart from the planar array of LCD devices and configured to illuminate at least a subset of the LCD devices of the planar array of LCD devices such that, in operation, the laser diode device provides backlighting for the subset of LCD devices of the planar array of LCD devices, wherein at least one of the transmissive liquid crystal display devices of the planar array of transmissive liquid crystal display devices comprises:
    a liquid crystal shutter;
    an analyzer positioned to receive light passing through the liquid crystal shutter; and
    an optical filter positioned to filter light passing through the liquid crystal shutter, wherein the optical filter has a passband of about 50 nm or less in the green or blue portions of the visible spectrum.

13. The display of claim 12, further comprising a polarizer configured to polarize light generated by an LCD backlight and impinging on the liquid crystal shutter.

14. The display of claim 13, wherein the optical filter is positioned between the laser diode and the polarizer.

15. The display of claim 12, wherein the optical filter is positioned between the laser diode and the liquid crystal shutter.

16. The display of claim 12, wherein the optical filter is positioned between the liquid crystal shutter and the analyzer.

17. The display of claim 12, wherein the analyzer is positioned between the optical filter and the liquid crystal shutter.

* * * * *